United States Patent

[11] 3,600,981

| [72] | Inventor | Nicholas A. Wagner<br>Chester, Va. |
|---|---|---|
| [21] | Appl. No. | 876,531 |
| [22] | Filed | Nov. 13, 1969 |
| [45] | Patented | Aug. 24, 1971 |
| [73] | Assignee | Reynolds Metal Company<br>Richmond, Va. |

[54] ELECTRODES FOR ELECTRICAL DISCHARGE MACHINING AND OF MAKING SUCH ELECTRODES AND ASSOCIATED DIES
13 Claims, 11 Drawing Figs.

| [52] | U.S. Cl. | 76/107 R,<br>117/207, 219/69 |
|---|---|---|
| [51] | Int. Cl. | B21k 5/20 |
| [50] | Field of Search | 76/107 R;<br>219/69 M; 117/207 |

[56] References Cited
UNITED STATES PATENTS

| 3,120,601 | 2/1964 | Berlin et al. | 219/69 |
|---|---|---|---|
| 3,240,914 | 3/1966 | Hill et al. | 76/107 X |
| 3,244,852 | 4/1966 | Herterick et al. | 219/69 |
| 3,252,828 | 5/1966 | Quaas | 117/207 |

*Primary Examiner*—Bernard Stickney
*Attorney*—Glenn, Palmer, Lyne, Gibbs & Thompson ABSTRACT: Electrodes for use in electrical discharge machining, and method of making same, are provided wherein a plurality of substantially identical electrodes are made from sections cut from elongated members extruded through a master die. The elongated members may be coated with a highly electrically conductive material which assures each electrode has optimum wear resistance.

INVENTOR.
NICHOLAS A. WAGNER

BY Glenn, Palmer, Lyne,
Gibbs & Thompson

HIS ATTORNEYS

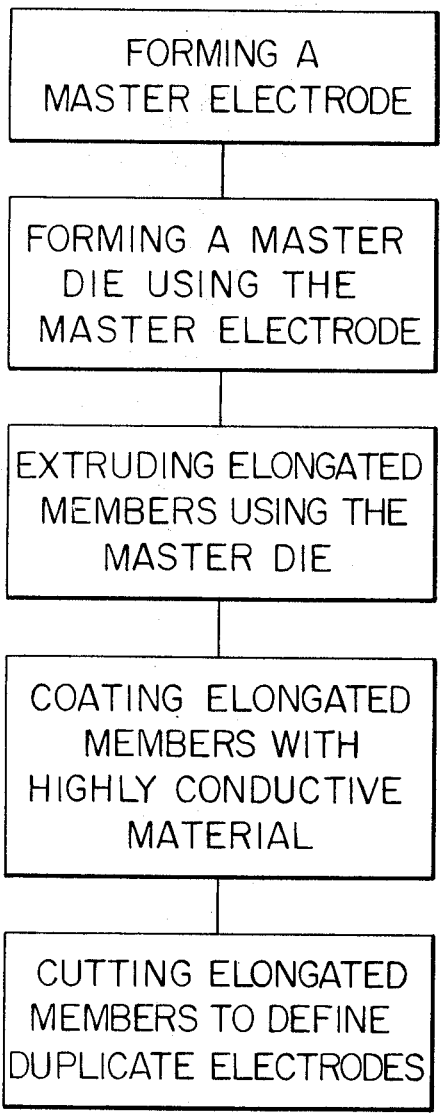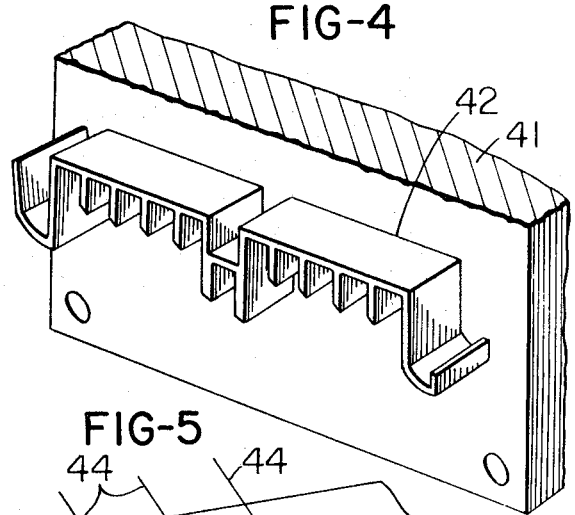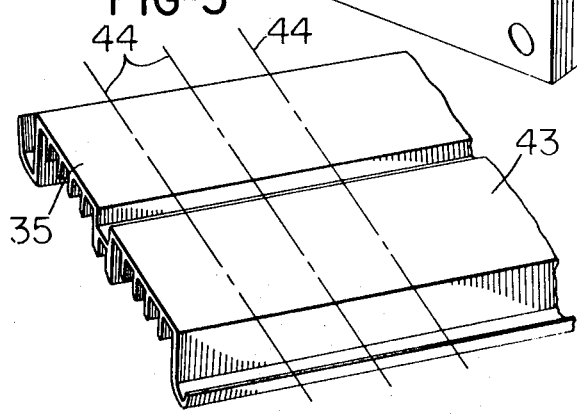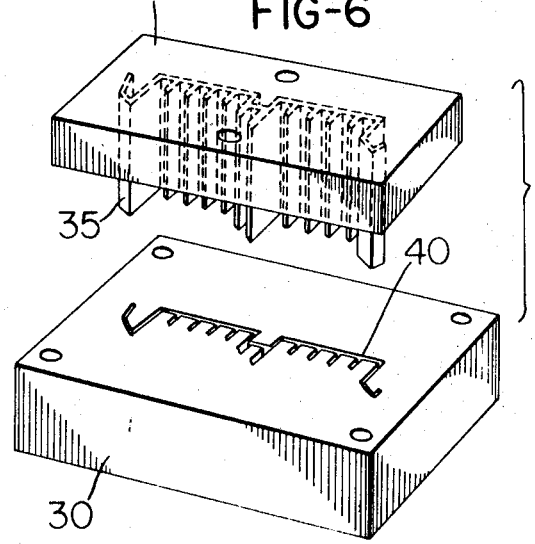

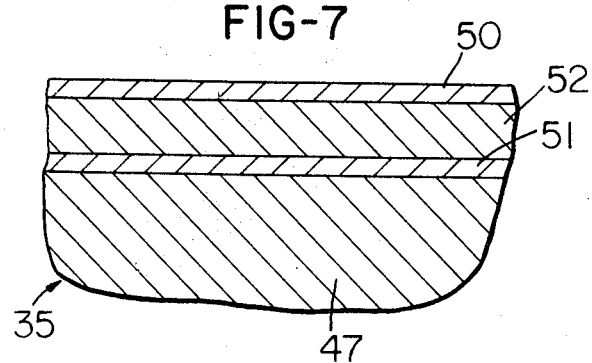
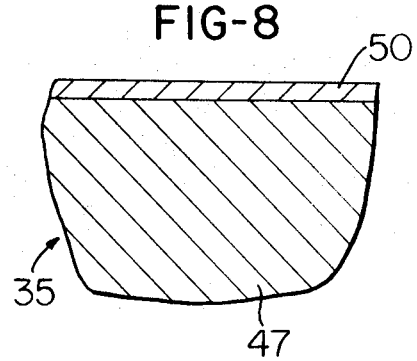
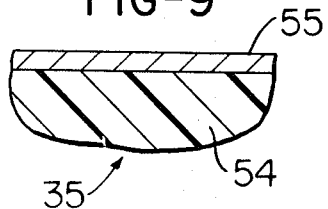
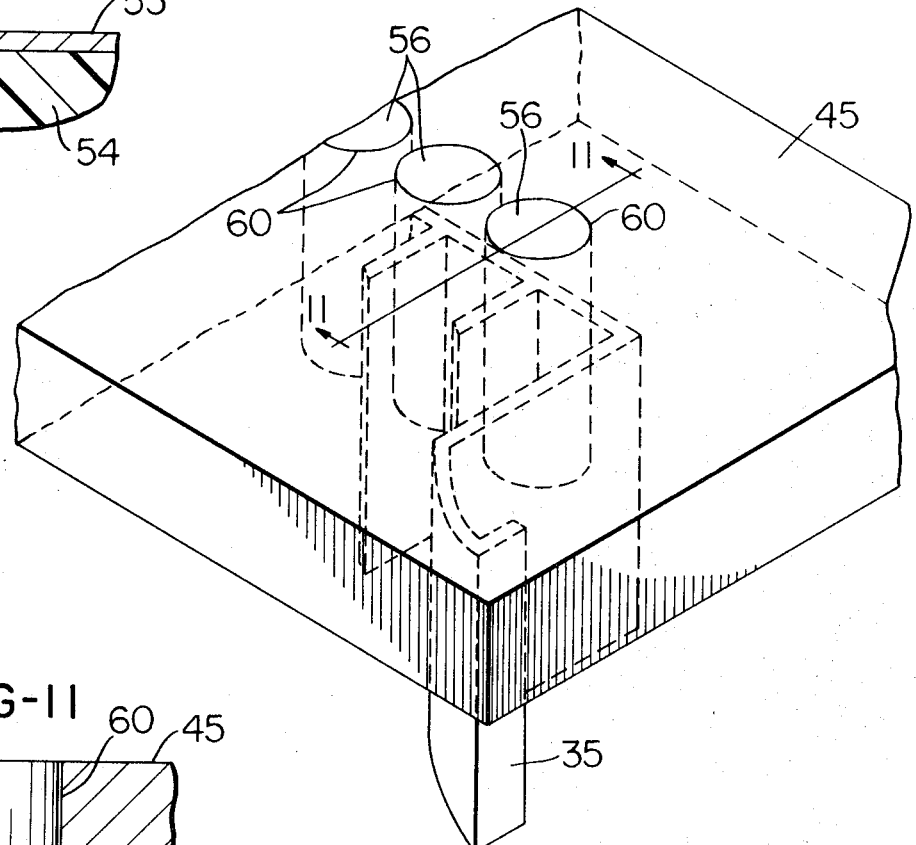
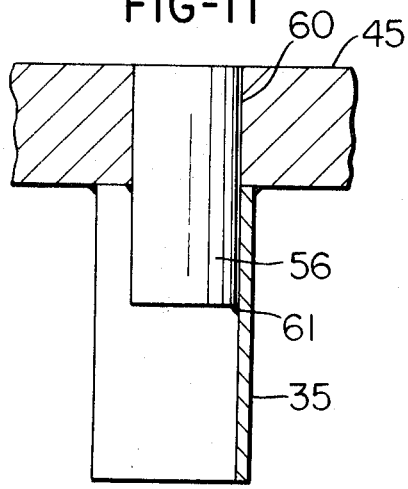
INVENTOR.
NICHOLAS A. WAGNER

ELECTRODES FOR ELECTRICAL DISCHARGE MACHINING AND OF MAKING SUCH ELECTRODES AND ASSOCIATED DIES

BACKGROUND OF THE INVENTION

In the extrusion of articles in large production quantities it is generally very expensive and time consuming to manufacture the necessary dies of identical configurations and in the required quantities to assure that the extruded articles are substantially identical throughout the production run. One technique which has been used to make extrusion dies in production quantities is to "rough cut" an initial opening in a die block and then form the final opening by electrical discharge machining. Heretofore, the electrodes used to make such final opening were difficult to make with repeated accuracy and required considerable time on the part of a skilled toolmaker whereby the electrodes and final extrusion dies were very expensive.

SUMMARY

This invention provides improved electrodes for use in electrical discharge machining, and a method of making same, wherein a plurality of substantially identical electrodes are made from sections cut from elongated members extruded through a master die. The elongated members are made from a comparatively inexpensive base material which may be suitably coated with a highly conductive material, as compared to the base material, to substantially improve the wear resistance of the electrodes during electrical discharge machining and thereby enable the making of electrodes and extrusion dies in large production quantities at a minimum cost.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present preferred embodiments of this invention, in which

FIG. 3 is a block diagram illustrating certain method steps which may be used in making low-cost electrodes for electrical discharge machining;

FIG. 4 is a fragmentary perspective view illustrating a master die through which a suitable material is extruded to define elongated members which are used to make electrodes in accordance with this invention;

FIG. 5 is a fragmentary perspective view of an elongated extruded member made by extruding through the die of FIG. 4 and illustrating by dotted lines the manner in which the elongated member is cut to predetermined lengths to define sections which are used in making electrodes;

FIG. 6 is an exploded perspective view illustrating an electrode made by cutting a section from the elongated member of FIG. 5 fixed to an associated mounting plate and illustrating such electrode aligned over a roughly cut die block which is to be finally cut by electroerosion;

FIG. 7 is a greatly enlarged fragmentary cross-sectional view of a portion of an electrode similar to the electrode of FIG. 6 after coating such electrode with a base coating of zinc, an intermediate coating of copper, and an outer coating of silver;

FIG. 8 is a greatly enlarged fragmentary cross-sectional view of an electrode similar to the electrode of FIG. 6 after coating such electrode with a single coating of silver;

FIG. 9 is a cross-sectional view similar to FIG. 8 of an electrode made of plastic material and having an electrically conductive metallic coating applied thereon;

FIG. 10 is a fragmentary perspective view illustrating another exemplary embodiment of an electrode similar to the electrode of FIG. 7 which utilizes rigidizing members to stabilize such electrode in an associated mounting plate; and FIG. 11 is a fragmentary cross-sectional view taken on the line 11–11 of FIG. 10.

DESCRIPTION OF ILLUSTRATED EMBODIMENTS

Figure 1:
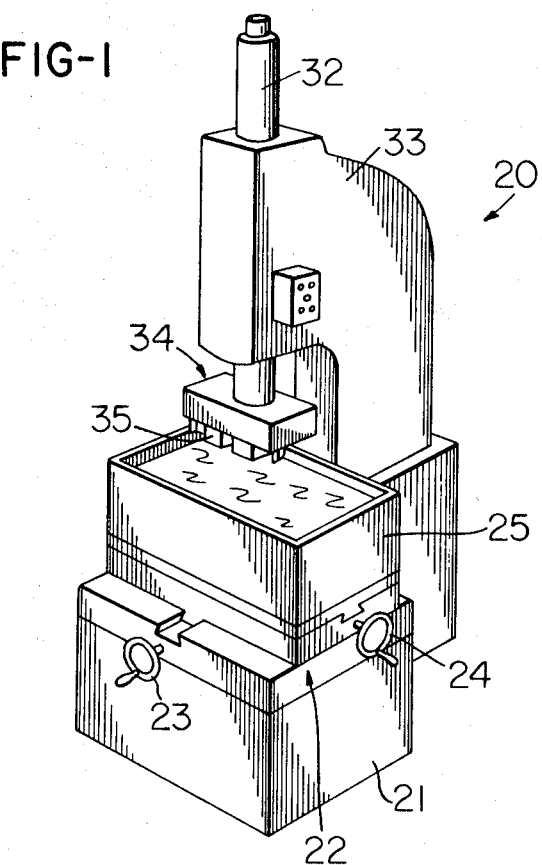
FIG. 1 is a perspective view illustrating a typical electrical discharge machine of known construction which utilizes improved electrodes of this invention.

Reference is now made to FIG. 1 of the drawings which illustrates a typical electrical discharge machine 20 which may utilize the improved electrode of this invention. The machine 20 is of the type sold by the Elox Corporation of Michigan, located at Troy, Michigan,c9 and inasmuch as the general operation of such a machine is well known in the art it will be described only briefly.

Figure 2:
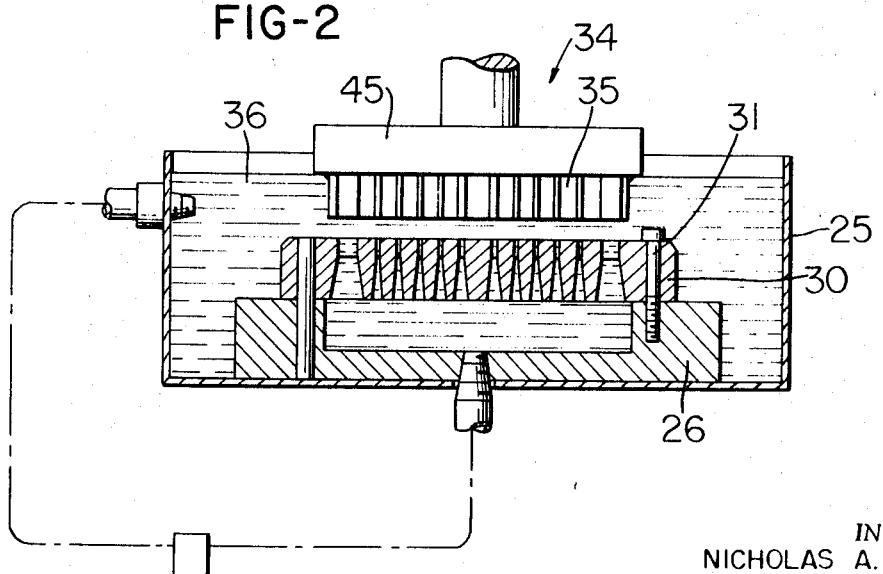
FIG. 2 is a view with parts shown in elevation, cross section, and schematically to illustrate the manner in which electroerosion takes place in the machine of FIG. 1.

In particular, the machine 20 comprises a base 21 which supports the worktable 22 which may be moved in mutually perpendicular directions in a horizontal plane by hand wheels 23 and 24. The worktable 22 carries a tank 25 which has a suitable fixture 26, see FIG. 2, supported therein. The fixture 26 has a roughly cut die block 30, also shown in perspective view in FIG. 6, suitably fixed thereto by bolts 31. The machine 20 has a head assembly 32 which is axially vertically slidable through the upper portion of a supporting structure 33 extending upwardly from the base 21 and the head assembly has an electrode assembly 34 suitably mounted thereon which includes an improved electrode 35 constructed in accordance with this invention.

The machine 20 has an electrical power supply which provides pulsating direct current and has suitable leads connected to the die block 30 and the electrode 35 of the assembly 34. During machining by electroerosion techniques, the die block 30 and electrode 35 are submerged in a dielectric oil 36 and the electrode 35 is relatively moved toward the die block 30 while pulsating direct current between the electrode and the die block and simultaneously circulating dielectric oil through the opening 40 to thereby complete the shaping and sizing of such opening and define a production die which may be used in a suitable extrusion press to extrude articles therethrough in a known manner.

Reference is now made to FIGS. 3–6 of the drawings which present various steps which may be utilized in making precision electrodes and dies in large quantities. In particular, a master electrode is formed using known techniques and materials and such electrode has a cross-sectional configuration corresponding to the configuration of articles to be extruded in mass production quantities. The master electrode is used to electroerode a roughly cut opening in a die block similar to the die block 30 to define what may be considered a master die 41, as shown in FIG. 4, which has the final die opening 42 provided therein.

An extrudable material such as a common metallic conductor or a plastic material is then extruded through the die block 41 to define elongated members which may be referred to as stock members 43 and a fragmentary portion of a typical member is illustrated in FIG. 5 of the drawings.

After extrusion of the elongated members 43 such members may be suitably coated with a highly electrically conductive material. The coating may be applied by any suitable technique such as electroplating, for example, and has a' specific resistance which is less than the specific resistance of the base material or structure comprising each elongated member 43. The character and amount of coating which may be applied on each elongated member will be described in more detail subsequently.

Each elongated member 43 may then be cut to any desired length using a suitable cutting device and as shown by dotted lines 44 to define a plurality of electrode sections or duplicate electrodes which for ease of correlation to the previously described electrode used in the machine 20 will be given the reference numeral 35. Thus, it is seen that each electrode section 35 has substantially the identical cross-sectional configuration as the die opening of the master die 41 through which it was extruded and each electrode may then be used in the electrical discharge machine 20 to produce dies in production quantities which are substantially identical to the master die 41. Each duplicate or production electrode 35 is mounted to an associated mounting plate 45, see FIG. 6, and such mounting may be achieved by fixing an end of the coated electrode section or electrode 35 against the lower surface of the mounting plate 45 utilizing suitable adhesive means, soldering, welding, brazing, or the like.

Each die block 30 may be made from any suitable known material which is commonly used to make extrusion dies. In addition, any suitable technique may be used to provide an initial undersize opening in the die block, such as, a band saw, for example, and the technique employed will depend on the complexity of such opening.

With the technique described above, large quantities of electrodes 35 may be formed by extruding large numbers of elongated members 43 through the master die 41 and these electrodes generally will be sufficient in quantity to enable completion of a large mass production run without the need to make additional master dies whereby the final articles extruded through the production dies utilizing the electrodes 35 will have substantially identical cross-sectional configurations. Further, it may be desirable to make a small number of dies using electrodes made from the first few elongated members extruded through the master die 41 and such small number of dies may themselves be used as master dies.

Any suitable electrical conductor may be used and extruded through the master die 41 to define elongated member 43; however, it has been found that suitably coated metallic materials containing aluminum have given good performance. Exceptionally good performance has been obtained using 6101 aluminum alloy.

Various electrically conductive coatings may be applied on electrodes 35 made of metallic materials containing aluminum to improve their resistance to wear or damaging erosion during electromachining operations. Good results have been obtained when the base aluminum metal indicated by the reference numeral 47, in the fragmentary portion of the electrode 35 shown in FIG. 8, is coated with a coating 50 of silver. The silver coating may range in thickness between 0.0001 and 0.001 inch.

It has also been found by extensive tests that optimum wear resistance is provided by coating each elongated member made of metallic material containing aluminum with layers or coatings of zinc, copper, and silver. This is illustrated in FIG. 7 of the drawings which illustrates an electrode 35 having an aluminum base structure 47 which has a base coating 51 of zinc which is generally of the order of 0.0001 inch thick, followed by an intermediate coating 52 of copper generally of the order of 0.0003 inch thick, and then topped with an outer coating 50 of silver having a thickness of at least 0.0001 inch. The outer silver coating in such a triple-coated electrode may be much thicker than 0.0001 inch and in some applications such outer coating may be as thick as 0.001 inch or more.

The above-mentioned thicknesses of the zinc and copper coatings are the ones that have given the best results. However, it is to be understood that different thicknesses of these materials may be applied and having ratios different than the ratio thereof presented herein. In particular, coatings of Zinc, copper, and similar materials may have thicknesses of 0.001 inch or more, as previously mentioned in connection with the silver coating.

Most of the work conducted to date has been with electrodes which have a base material which is a metallic electrical conductor; however, it is believed that nonconductors suitably coated with an electrically conductive material may be used to make electrodes which provide improved performance and at maximum economy. In particular, it is believed that plastic materials, or the like, may be extruded through an associated master die to form elongated members as shown in FIG. 5. The elongated members may then be coated with a highly electrically conductive material and cut in lengths to define electrodes which will then be fastened to associated base or mounting plates and utilized in forming other dies in a similar manner as previously described above. A fragmentary portion of an electrode formed in this way is illustrated in FIG. 9 and also designated by the reference numeral 35; and, such electrode has a base material made of plastic 54 and a coating 55 of a suitable electric conductor having a low specific resistance or low resistivity. The coating 55 may be any suitable thickness ranging between 0.0001 and 0.001 inch thick and even thicker.

In utilizing nonmetallic materials such as electrical nonconductors or insulators any suitable technique known in the art may be employed to apply the coating of electrically conductive material on such nonconductor. Further, it will be appreciated that in using a plastic material the finally extruded elongated member should be hard, tough, and rigid so that it may be utilized in a similar manner as a metallic member to define high-quality electrodes.

In many applications of this invention it may be necessary to provide electrodes of extended lengths which must be stabilized to prevent undue flexing thereof during the electroerosion process. Accordingly, rigidizing means such as a plurality of pins 56 may be utilized as illustrated in FIGS. 10 and 11 of the drawings. Each pin 56 is suitably fixed in an associated opening 60 in the base or mounting plate 45 as by welding, brazing, or the like and has an end portion of extended length extending outwardly from the inside surface of the mounting plate and against which a portion of the electrode 35 is suitably fixed as indicated at 61 to provide support therefor. The utilization of rigidizing pins 56 enables optimum support of an electrode of extended length while allowing maximum circulation of the fluid 46 during machining utilizing an electrical discharge machining process.

In this example of the invention the cross-sectional configuration of the articles to be extruded is defined by a rather complicated die opening 42 in the die 41. The complicated die opening 42 highlights the manner in which complex electrodes and dies may be made utilizing the teachings of this invention. However, it will be appreciated that the techniques of this invention are fully applicable to the formation of electrodes and dies having comparatively simple configurations.

In this presentation of the invention the elongated members 43 have been described as being suitably coated prior to cutting thereof in definite sections or lengths to form electrodes; however, it will be appreciated that in some applications of this invention it may be desired to coat the sections or electrodes after cutting from an associated elongated member 43.

While present exemplary embodiments of this invention, and methods of practicing the same, have been illustrated and described, it will be recognized that this invention may be otherwise variously embodied and practiced within the scope of the following claims.

What I claim is:

1. A method of making electrodes for use in electrical discharge machining comprising the steps of, forming a master electrode using conventional techniques, forming a master die with said master electrode, extruding an extrudable material through said master die to define elongated members each having a cross-sectional configuration which is substantially identical to the cross-sectional configuration of said master electrode, cutting said members to define a plurality of duplicate electrodes which are substantially identical in configuration to said master electrode, said duplicate electrodes being used to form production dies used to extrude articles in large production quantities.

2. A method as set forth in claim 1 in which said extruding step comprises extruding a material which is an electrical conductor.

3. A method as set forth in claim 1 in which said extruding step comprises extruding a nonmetallic material to define said elongated members made of said nonmetallic material and comprising the further step of coating said elongated members with a coating of an electrical conducting material having a low specific resistance.

4. A method as set forth in claim 1 in which said extruding step comprises extruding a metallic material which is an electrical conductor to define said elongated members made of said metallic material and comprising the further step of coating said elongated members with a coating of an electrical conducting material having a specific resistance which is less than the specific resistance of said elongated members.

5. A method as set forth in claim 1 in which said extruding step comprises extruding a metallic material containing aluminum to define said elongated members.

6. A method as set forth in claim 5 and comprising the further step of coating said elongated members with a coating of silver ranging between 0.0001 to 0.001 inch thick to thereby provide duplicate electrodes having improved wear resistance.

7. A method as set forth in claim 5 and comprising the further steps of coating each of said elongated members with zinc, copper, and silver to thereby provide duplicate electrodes having improved wear resistance.

8. A method as set forth in claim 5 and comprising the further steps of coating each of said elongated members with a base coating of zinc generally of the order of 0.0001 inch thick, and intermediate coating of copper generally of the order of 0.0003 inch thick, and an outer coating of silver having a thickness of at least 0.0001 inch to thereby provide duplicate electrodes having optimum wear resistance.

9. A method of making substantially identical extrusion dies in large production quantities comprising the steps of, forming a master electrode using conventional techniques, cutting a rough undersize initial opening in a die block having the approximate shape of a desired final opening in a completed extrusion die, electroeroding said die block using said master electrode to define a master extrusion die having a final opening provided therein, extruding an extrudable material through said master die to define a plurality of elongated members each having a cross-sectional configuration which is substantially identical to the cross-sectional configuration of said master electrode, cutting said elongated members to define a plurality of duplicate electrodes which are substantially identical in configuration to said master electrode, and electroeroding other die blocks with said duplicate electrodes after cutting initial openings therein to define said substantially identical extrusion dies in large production quantities and thereby assure workpieces extruded in large production quantities through said production extrusion dies have substantially identical cross-sectional configurations.

10. A method as set forth in claim 9 and comprising the further step of coating said elongated members with a coating of an electrical conducting material having a specific resistance which is less than the specific resistance of said elongated members.

11. A method as set forth in claim 10 in which said extruding step comprises extruding a metallic material containing aluminum to define said elongated members and said coating step comprises coating by electroplating.

12. A method as set forth in claim 10 in which said extruding step comprises extruding an electrical nonconductor.

13. A method as set forth in claim 9 in which said extruding step comprises extruding an aluminum alloy to define said elongated members and comprising the further steps of coating each of said elongated members with a base coating of zinc generally of the order of 0.0001 inch thick, an intermediate coating of copper generally of the order of 0.0003 inch thick, and an outer coating of silver having a thickness of at least 0.0001 inch.